(12) United States Patent
Bernard et al.

(10) Patent No.: US 9,941,934 B2
(45) Date of Patent: *Apr. 10, 2018

(54) METHOD AND DEVICE FOR MODULATING AN ACTIVE LOAD

(71) Applicant: INSIDE SECURE, Meyreuil (FR)

(72) Inventors: Frédéric Bernard, Saint Julien (FR); Nicolas Cordier, Luynes (FR); Florian Pernisek, Aix-en-Provence (FR); Bruno Charrat, Aix-en-Provence (FR)

(73) Assignee: Inside Secure, Meyreuil (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/433,884

(22) Filed: Feb. 15, 2017

(65) Prior Publication Data

US 2017/0180008 A1  Jun. 22, 2017

Related U.S. Application Data

(63) Continuation of application No. 15/144,034, filed on May 2, 2016, which is a continuation of application
(Continued)

(30) Foreign Application Priority Data

Sep. 21, 2010  (FR) ..................... 10 03754

(51) Int. Cl.
 *H04B 5/00* (2006.01)
 *H04L 7/08* (2006.01)
(52) U.S. Cl.
 CPC ............. *H04B 5/0031* (2013.01); *H04L 7/08* (2013.01)
(58) Field of Classification Search
 CPC ...... H04B 5/00; H04B 5/0025; H04B 5/0031; G06K 19/0723
 See application file for complete search history.

(56) References Cited

U.S. PATENT DOCUMENTS 4,679,168 A  7/1987 Conway et al.
5,453,748 A  9/1995 Lindell
(Continued)

FOREIGN PATENT DOCUMENTS

DE  10-2007-061361 A1  12/2007
EP  1327222 B1  4/2004
(Continued)

OTHER PUBLICATIONS

International Search Report and Written Opinion received for FR Application No. 1003752, dated Mar. 23, 2011.
(Continued)

*Primary Examiner* — Gennnadiy Tsvey
(74) *Attorney, Agent, or Firm* — Brake Hughes Bellermann LLP

(57) ABSTRACT

In a general aspect, a method can include producing, by an inductive antenna circuit, a first periodic signal that is based on an alternating external magnetic field; producing, by an oscillator circuit, a second periodic signal that is based on the first periodic signal; and transmitting, in correspondence with a data-carrying modulation signal, a sequence of data bits. The transmitting can include sequentially and repetitively: applying, with the oscillator circuit operating in a free oscillation mode, the second periodic signal to the inductive antenna circuit; and inhibiting, with the oscillator circuit operating in a synchronous oscillation mode, application of the second periodic signal to the inductive antenna circuit. The synchronous oscillation mode of the oscillator circuit can cause the second periodic signal to be synchronized to the first periodic signal.

16 Claims, 5 Drawing Sheets

Related U.S. Application Data

No. 13/976,527, filed as application No. PCT/FR2011/052183 on Sep. 21, 2011, now Pat. No. 9,331,748.

(56) References Cited

U.S. PATENT DOCUMENTS

| | | | |
|---|---|---|---|
| 5,548,291 | A | 8/1996 | Meier et al. |
| 7,098,770 | B2 | 8/2006 | Charrat et al. |
| 7,106,246 | B1 | 9/2006 | Lindell |
| 9,331,748 | B2 | 5/2016 | Bernard et al. |
| 2006/0022800 | A1 | 2/2006 | Krishna et al. |
| 2007/0023517 | A1 | 2/2007 | Tan et al. |
| 2008/0018433 | A1* | 1/2008 | Pitt-Pladdy ......... G06K 7/0008 340/10.4 |
| 2009/0108063 | A1 | 4/2009 | Jain et al. |
| 2009/0284377 | A1 | 11/2009 | Tuttle et al. |
| 2010/0102932 | A1 | 4/2010 | Hill et al. |
| 2010/0127820 | A1 | 5/2010 | Froitzheim |
| 2016/0308584 | A1 | 10/2016 | Bernard et al. |

FOREIGN PATENT DOCUMENTS

| | | |
|---|---|---|
| EP | 1801741 A2 | 6/2007 |
| EP | 2211295 A2 | 7/2010 |
| WO | 1998/058509 A1 | 6/1997 |
| WO | 2001/067625 A1 | 3/2001 |

OTHER PUBLICATIONS

International Search Report and Written Opinion received for FR Application No. 1003754, dated Jul. 18, 2011.
International Search Report and Written Opinion received for FR Application No. 1151552, dated Jul. 28, 2011.
International Search Report and Written Opinion for PCT Application No. PCT/FR2011/052183, dated May 29, 2012, 13 pages.
International Preliminary Report and Patentability Report for PCT Patent Application No. FR2011/052183, dated Mar. 26, 2013, 7 Pages.
ISO Standard 14443, Introduction: "An introduction to the contactless standard for smart cards and its relevance to customers," published by the International Organization for Standardization, 9 pages.
ISO Standard 18092: "Information technology—Telecommunications and information exchange between systems—Near Field Communication—Interface and Protocol," published 2004 by the International Organization for Standardization, 58 pages.
ISO Standard 7816, Part 4: "Identification cards—Integrated circuit cards—Organization, security and commands for interchange," published 2005 by the International Organization for Standardization, 83 pages.
ISO Standard 15693, Part 2: "Identification cards—Contactless integrated circuit cards—Vicinity cards—Air interface and initialization," published 2006 by the International Organization for Standardization, 14 pages.
ISO Standard 7816, Part 3: "Identification cards—Integrated circuit cards—Cards with contacts—Electrical interface and transmission protocols," published 2006 by the International Organization for Standardization, 50 pages.
ISO Standard 14443, Part 4: "Identification cards—Contactless integrated circuit cards—Proximity cards—Transmission protocol," published 2008 by the International Organization for Standardization, 37 pages.
ISO Standard 15693, Part 3: "Identification cards—Contactless integrated circuit cards—Vicinity cards—Anticollision and transmission protocol," published 2009 by the International Organization for Standardization, 43 pages.
ISO Standard 14443, Part 2: "Identification cards—Contactless integrated circuit cards—Proximity cards—Radio frequency power and signal interface," published 2010 by the International Organization for Standardization, 24 pages.
ISO Standard 14443, Part 3: "Identification cards—Contactless integrated circuit cards—Proximity cards—Initialization and anticollision," published 2011 by the International Organization for Standardization, 60 pages.
U.S. Appl. No. 13/976,527, filed Jun. 26, 2013, Issued.
U.S. Appl. No. 15/144,034, filed May 2, 2016, Pending.

\* cited by examiner

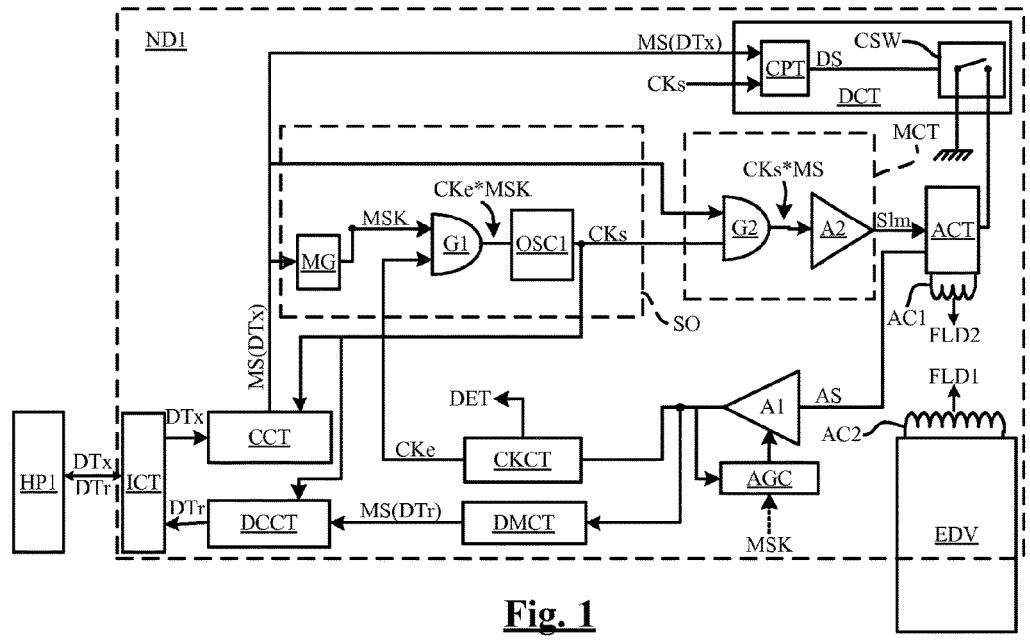
Fig. 1
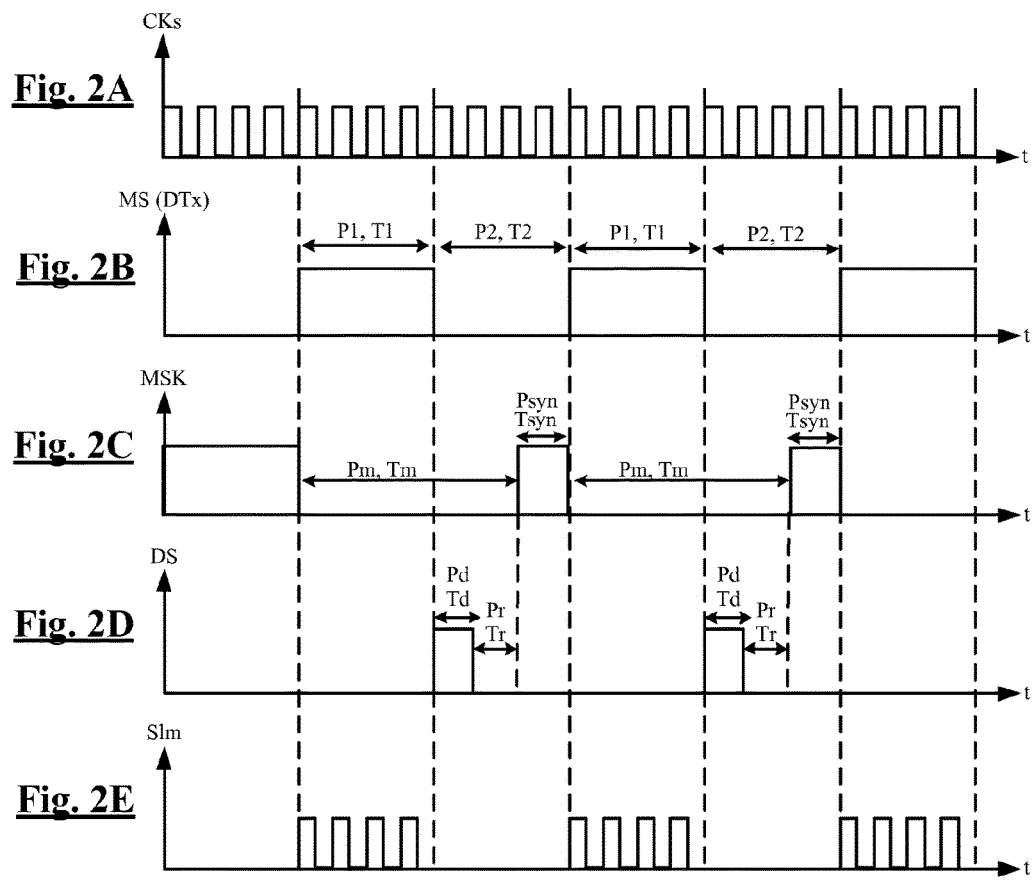
Fig. 2A
Fig. 2B
Fig. 2C
Fig. 2D
Fig. 2E

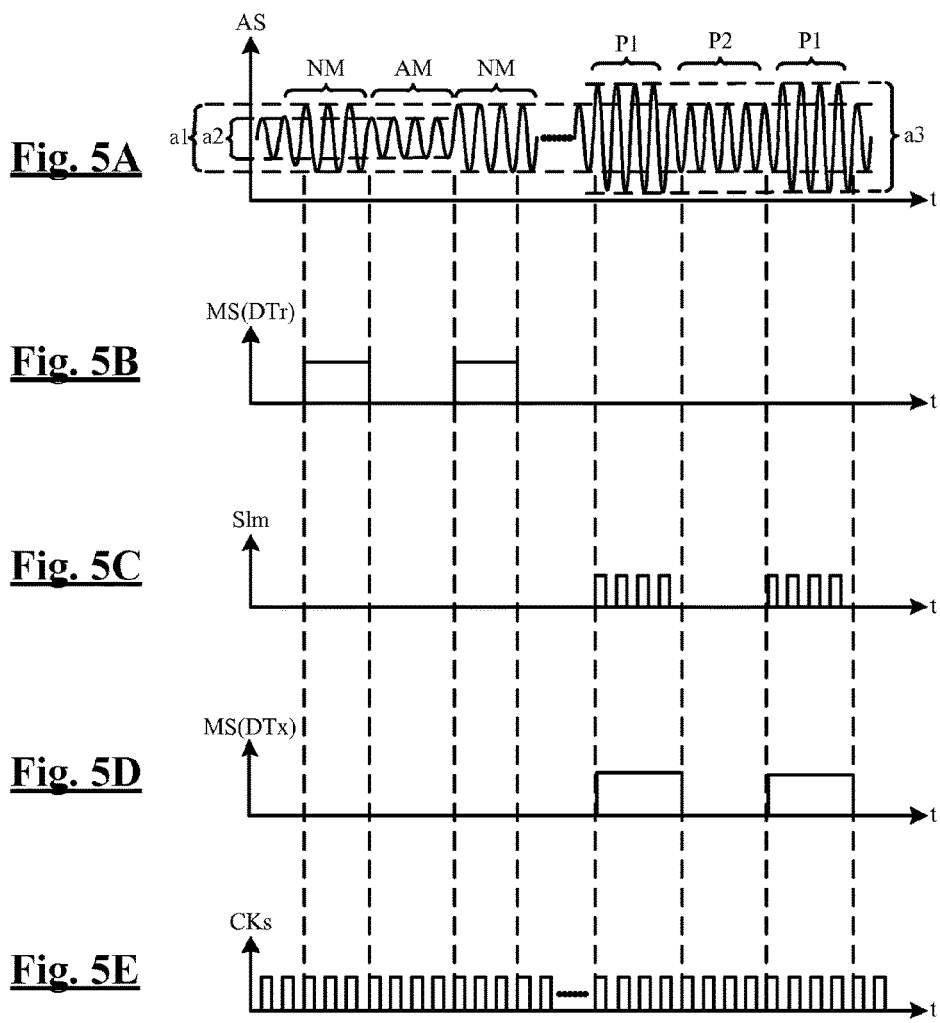
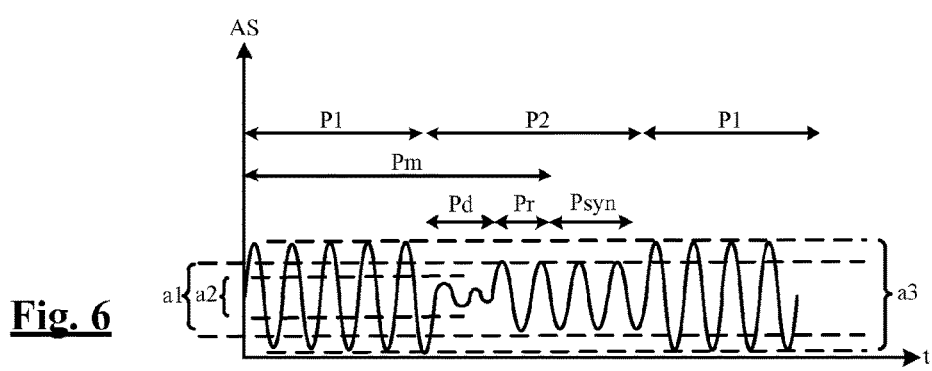

METHOD AND DEVICE FOR MODULATING AN ACTIVE LOAD

CROSS-REFERENCE TO RELATED APPLICATIONS

This application is a continuation of U.S. application Ser. No. 15/144,034, which is a continuation of U.S. application Ser. No. 13/976,527, filed Jun. 27, 2013, which is a Section 371 of International Application No. PCT/FR2011/052183, filed Sep. 21, 2011, which was published in the French language on Mar. 29, 2012, under International Publication No. WO 2012/038664 A2, and which claims priority to French Application No. 100374, filed Sep. 21, 2010, the disclosures of which are all incorporated herein by reference in their entirety.

BACKGROUND OF THE INVENTION

Embodiments of the present invention relate to a method for sending data by inductive coupling, including receiving an antenna signal by way of an inductive antenna circuit in the presence of an alternating external magnetic field, extracting from the antenna signal a first periodic signal, producing a second periodic signal by way of a synchronous oscillator having a synchronization input receiving the first periodic signal, placing the oscillator in a free oscillation mode and applying to the antenna circuit bursts of the second periodic signal to generate an active load modulation magnetic field.

Embodiments of the present invention also relate to a device for sending and receiving data designed to implement this method.

Generally speaking, the present invention relates to inductive coupling communication techniques, also known as "Near Field Communications" or NFC. A communication by inductive coupling generally involves a so-called passive device and a so-called active device. The two devices are equipped with an antenna coil. The active device emits a magnetic field oscillating for example at 13.56 MHz, and sends data to the passive device by modulating the magnetic field. This magnetic field is designated below "external magnetic field". The passive device sends data to the active device by load modulation.

The load modulation may be passive or active. Passive load modulation involves modifying the impedance of the antenna coil of the passive device at the rate of a data-carrying load modulation signal. This impedance modulation affects the impedance of the antenna coil of the active device, by inductive coupling. The active device may therefore extract from its antenna signal the load modulation signal used by the passive device, and deduce therefrom the data that the passive device sends it.

Active load modulation involves emitting bursts of alternating magnetic field, at the rate of the data-carrying modulation signal. The bursts of magnetic field are perceived by the active device as a passive load modulation. This technique was proposed by the applicant in European Patent EP 1 327 222 (U.S. Pat. No. 7,098,770B2), (see FIGS. 4A to 4E, page 8 table 4, paragraph [0074].

Compared to passive load modulation, active load modulation offers a greater communication distance and/or better data transmission in a hostile environment, for example an environment disturbed by metallic masses generating Foucault (Eddy) currents. However, active load modulation requires circuitry for driving the antenna coil and thus a current source, but consumes much less current than a continuous emission of magnetic field.

An active load modulation device cannot therefore be purely passive in terms of power supply (a purely passive device being electrically powered by the magnetic field emitted by the active device) but is nevertheless considered "passive" in that it does not emit the external magnetic field necessary for the communication.

To obtain a maximum communication distance, the active load modulation also requires that the load modulation magnetic field be in phase with the external magnetic field emitted by the active device. Phase rotations between the active load modulation magnetic field and the external magnetic field may cause undesirable fluctuations in the communication distance.

European Patent EP 1 801 741 describes an active load modulation NFC device using a phase locked loop to control the phase of the load modulation magnetic field (see e.g., FIG. 19). The phase locked loop includes a Voltage-Controlled Oscillator (VCO), a phase comparator, and a low-pass filter supplying a control voltage to the VCO. The phase comparator receives, as a reference frequency, a first periodic signal extracted from the antenna signal induced by the external magnetic field. The phase locked loop supplies a second periodic signal the phase of which is set on that of the first periodic signal. In data send mode, bursts of the second periodic signal are applied to the antenna circuit to generate the bursts of magnetic field.

When the device switches into the data send mode, the first periodic signal is no longer applied to the phase comparator and a sample hold circuit HLD maintains the control voltage applied to the VCO. The phase locked loop thus switches from a synchronous operating mode into a free oscillation mode and remains in this operating mode until the end of the data sending.

If it is desirable for the bursts of magnetic field to be in phase with the external magnetic field, the phase locked loop must have a very slight phase shift over the entire duration of the data send mode, which is at least equal to the duration of sending a data frame. In practice, the maximal phase shift tolerated over this period is generally in the order of ¼ of the period of the magnetic field oscillating at 13.56 MHz.

As an example, an ISO 14443-A frame has a duration in the order of 25.6 ms. As the frequency of the periodic signal is 13.56 MHz, the phase shift of the phase locked loop in free oscillation mode should preferably not be more than 18 ns, i.e. ¼ of the period of the magnetic field oscillating at 13.56 MHz.

Now, obtaining a stability greater than 18 ns over a duration of 25.6 ms means that the phase locked loop must offer extremely high precision, in the order of 0.7 ppm ($(18 \times 10^{-9}/25.6 \times 10^{-3})*10^6$). Such precision requires very high quality and expensive circuitry.

It may thus be desired to provide a way of providing bursts of magnetic field having a small phase shift relative to the external magnetic field, without using extremely precise and expensive circuitry.

BRIEF SUMMARY OF THE INVENTION

To this end, the present invention proposes using a synchronous oscillator and resynchronizing the oscillator on the external magnetic field before each application to the antenna circuit of a burst of a periodic signal supplied by the oscillator.

More particularly, some embodiments of the present invention relate to a method for sending data by inductive coupling, including applying an alternating external magnetic field to an inductive antenna circuit tuned to a carrier frequency of the external magnetic field; extracting an antenna signal from the antenna circuit; extracting from the antenna signal a first periodic signal; producing a second periodic signal by way of a synchronous oscillator having a synchronous oscillation mode set in phase with the first periodic signal and a free oscillation mode; placing the oscillator in the free oscillation mode; and applying a burst of the second periodic signal to the antenna circuit. The method includes, after applying a burst of the second periodic signal to the antenna circuit, an attenuation step of modifying the impedance of the antenna circuit to attenuate the amplitude of the antenna signal; a restoration step of ceasing to modify the impedance of the antenna circuit, to restore the amplitude of the antenna signal; and a resynchronization step of placing the oscillator in the synchronous oscillation mode before applying a new burst of the second periodic signal to the antenna circuit.

According to one embodiment, the method includes: supplying a data-carrying modulation signal, applying a burst of the second periodic signal to the antenna circuit when the modulation signal has a first logic value, and inhibiting the application of the first periodic signal to a synchronization input of the oscillator during the attenuation, restoration and synchronization periods.

According to one embodiment, the method includes inhibiting the application of the first periodic signal to the synchronization input of the oscillator by way of a masking signal.

According to one embodiment, the method includes phase shifting the second periodic signal relative to the antenna signal.

Some embodiments of the present invention also relate to a device for sending and receiving data by inductive coupling including an inductive antenna circuit in which an antenna signal appears in the presence of an alternating external magnetic field; means for extracting a first periodic signal from the antenna signal; a synchronous oscillator having a synchronization input receiving the first periodic signal, supplying a second periodic signal, the oscillator having a synchronous oscillation mode set in phase with the first periodic signal and a free oscillation mode; and an active load modulation circuit configured to apply bursts of the second periodic signal to the antenna circuit and to generate an active load modulation magnetic field. The device also includes means for modifying the impedance of the antenna circuit and is configured to place the oscillator in the free oscillation mode; apply to the antenna circuit a burst of the second periodic signal; modify the impedance of the antenna circuit to attenuate the amplitude of the antenna signal; cease modifying the impedance of the antenna circuit, to restore the amplitude of the antenna signal; and place the oscillator in the synchronous oscillation mode before applying a new burst of the second periodic signal to the antenna circuit.

According to one embodiment, the device is configured to supply a data-carrying modulation signal; apply a burst of the second periodic signal to the antenna circuit when the modulation signal has a first logic value; and inhibit the application of the first periodic signal to a synchronization input of the oscillator during the attenuation, restoration and synchronization periods.

According to one embodiment, the device is configured to inhibit the application of the first periodic signal to the synchronization input of the oscillator by way of a masking signal.

According to one embodiment, the means for modifying the impedance of the antenna circuit includes a switch, the closing of which modifies the impedance of the antenna circuit.

According to one embodiment, the means for modifying the impedance of the antenna circuit includes a timer to determine a duration during which the impedance of the antenna circuit is modified.

According to one embodiment, the synchronous oscillator is of the astable oscillator type having a specific self-oscillation frequency determined by components of the oscillator.

According to one embodiment, the synchronous oscillator is of the digital type and is configured, in the synchronous oscillation mode, to copy at output the period of the periodic signal applied to the synchronization input, and, in the free oscillation mode, to reconstitute at output the frequency received at the synchronization input during the synchronous oscillation mode.

According to one embodiment, the synchronous oscillator includes a phase locked loop including: a phase comparator supplying a phase signal; an active low-pass filter receiving the phase signal and supplying a control voltage; a voltage-controlled oscillator receiving the control voltage and supplying the second periodic signal; and means for inhibiting the phase comparator when switching into the free oscillation mode and for maintaining the value of the control voltage at the input of the voltage-controlled oscillator.

According to one embodiment, the device includes means for phase shifting the second periodic signal relative to the antenna signal.

Some embodiments of the present invention also relate to a device comprising a device for sending and receiving data according to the present invention, and at least one host processor supplying the device with data to be sent.

In one embodiment, the device is mounted in or on to a portable medium.

Some embodiments of the present invention also relate to a smart card, including at least one processor and a device for sending and receiving data according to the present invention.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

Some embodiments of a method and a device according to the present invention will be described below in relation with, but not limited to, the following figures in which:

In the drawings:

FIG. 1 represents an NFC device for sending/receiving data according to an embodiment of the present invention including a synchronous oscillator;

FIGS. 2A to 2E show signals occurring in the operation of the device in FIG. 1 during the sending of data by active load modulation;

FIGS. 3A to 3D show other signals occurring in the operation of the device in FIG. 1 during the sending of data by active load modulation;

FIG. 4 shows a phase error between a first periodic signal and a second periodic signal used by the device in FIG. 1;

FIG. 5A shows the shape of an antenna signal of the device in FIG. 1 upon receiving and sending data;

FIGS. 5B to 5E show signals associated with the antenna signal;

FIG. 6 is an expanded view of a part of FIG. 5A;

FIG. 7 represents a first example of an embodiment of a synchronous oscillator;

FIG. 8 represents a second example of an embodiment of a synchronous oscillator;

FIG. 9 represents an alternative embodiment of a part of the device in FIG. 1;

FIG. 10 represents another alternative embodiment of the device in FIG. 1;

Figure 11:
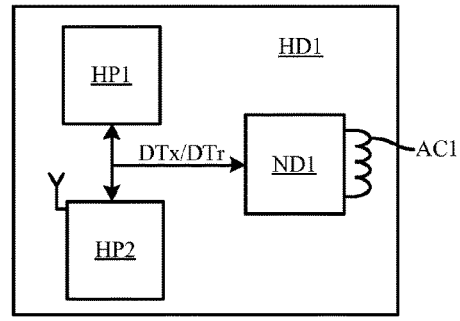
Figure 12A:
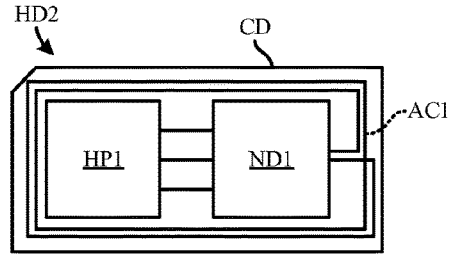
Figure 12B:
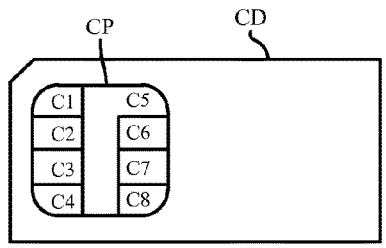

FIG. 11 shows an example of a portable device including a device for sending/receiving data according to the present invention; and FIGS. 12A, 12B are top and bottom views of another example of a portable device including a device for sending/receiving data according to the present invention.

DETAILED DESCRIPTION OF THE INVENTION

FIG. 1 represents a device ND1 for sending/receiving data according to the present invention, operating by inductive coupling. The device ND1 includes:
a contact communication interface circuit ICT,
an antenna circuit ACT tuned to a carrier frequency, comprising an antenna coil AC1 and which can comprise various other components such as capacitors and/or self-inductances,
a demodulation circuit DMCT coupled to a decoding circuit DCCT, to receive data DTr via the antenna circuit,
a coding circuit CCT coupled to a modulation circuit MCT, to send data DTx via the antenna circuit,
a damping circuit DCT,
a clock circuit CKCT, and
a synchronous oscillator SO.

The contact communication interface circuit ICT enables the device ND1 to be linked to at least one host processor HP1. The host processor HP1 supplies the data DTx and receives the data DTr. The data DTx/DTr is generally application data from an NFC application (transaction, payment, information exchange, or the like). In one alternative, the device ND1 can be autonomous and include an internal processor configured to manage contactless applications. The internal processor then generates the data DTx itself and processes the data DTr.

The clock circuit CKCT and the demodulation circuit DMCT receive an antenna signal AS present in the antenna circuit ACT. The antenna signal AS is for example extracted from the antenna circuit by an amplifier A1 the gain of which is controlled by an automatic gain control circuit AGC. The antenna signal AS appears in the presence of an alternating external magnetic field FLD1 emitted by an external device EDV of NFC reader type, equipped with an antenna coil AC2 and operating in the active mode (continuous emission of the magnetic field). The field FLD1 oscillates for example at a carrier frequency of 13.56 MHz (ISO 14443, ISO 13693, Sony Felica® standards) and the antenna circuit ACT is tuned to this carrier frequency.

The clock circuit CKCT supplies an external clock signal CKe, or "first periodic signal", the frequency of which is generally identical to the carrier frequency, i.e. 13.56 MHz in the framework of the abovementioned standards. In one embodiment, the circuit CKCT also supplies a signal DET that has a determined value, for example 1, when the field FLD2 is detected. The signal DET forms a carrier detection signal that may be useful in certain embodiments of the device ND1.

The synchronous oscillator SO receives the external clock signal CKe and supplies an internal clock signal CKs, or "second periodic signal". The oscillator SO has a synchronous oscillation mode in which the phase of the signal CKs is set on that of the signal CKe, and a free oscillation mode in which the signal CKs is no longer set in phase with the signal CKe.

To send data DTr to the device ND1, the external device EDV applies to the magnetic field FLD1 a modulation, for example an amplitude modulation, by way of a data-carrying modulation signal MS(DTr). The signal MS(DTr) is reflected in the antenna signal AS and is extracted therefrom by the demodulation circuit DMCT, after removal of the carrier. The circuit DMCT supplies the modulation signal MS(DTr) to the circuit DCCT which decodes and supplies the data DTr to the communication interface circuit ICT or the internal processor of the device ND1, if the latter is equipped with such a processor.

The data DTx to be sent to the external device EDV is supplied to the coding circuit CCT, which then supplies the modulation circuit MCT with a data-carrying modulation signal MS(DTx). This modulation signal MS(DTx) may be modulated with a sub-carrier derived from the carrier frequency, for example a sub-carrier of 848 kHz (ISO 14443) or of 424 kHz (ISO 15693), or simply be baseband coded without any sub-carrier (Sony Felica®). To generate the sub-carrier, the circuit MCT receives the internal clock signal CKs supplied by the synchronous oscillator.

The modulation circuit MCT is here an active load modulation circuit implementing the method described by the applicant in patent European Patent EP 1 327 222 (U.S. Pat. No. 7,098,770B2). The circuit MCT supplies the antenna circuit ACT with an active load modulation signal Slm that includes bursts (wavetrains) of the internal clock signal CKs, separated by periods of non-modulation during which the signal Slm has a default value, for example 0. The modulation circuit MCT here comprises an AND-type logic gate G2 receiving the signals CKs and MS(DTx) and supplying the signal Slm, and an amplifier A2 linking the output of the gate G2 and the point of application of the signal Slm to the antenna circuit ACT.

The signal Slm is here equal to 0 when the signal MS(DTx) is equal to 0, and copies the signal CKs when the signal MS(DTx) is equal to 1. Therefore, when the signal MS(DTx) is equal to 1, the antenna circuit ACT receives a burst of the signal CKs and the antenna coil AC1 emits a corresponding burst of a magnetic field FLD2. The bursts of magnetic field FLD2 are detected by the external device EDV as a passive load modulation. The latter may thus extract, from its own antenna signal, the signal MS(DTx) to deduce therefrom the data DTx sent by the device ND1.

The synchronous oscillator SO includes an oscillator circuit OSC1 having a synchronization input linked to the output of a masking circuit G1, here an AND gate. The gate G1 receives at its inputs the external clock signal CKe and a masking signal MSK. The signal MSK is supplied by a mask generator MG from the modulation signal MS(DTx). The signal MSK has a masking value, here 0, and a transparent value, here 1. The oscillator circuit OSC1 synchronizes itself on the external clock signal CKe when the latter is not masked (MSK=1) at its synchronization input, and operates in free oscillation mode when the signal CKe is masked (MSK=0). The masking signal has the masking value during the emission of a burst of magnetic field FLD2, and is maintained at this value during a supplementary lapse of time following the emission of the burst.

The damping circuit DCT is designed to modify the impedance of the antenna circuit so as to attenuate the antenna signal AS after the emission of a burst of magnetic field FLD2. Indeed, where the quality factor Q of the antenna circuit is high, the antenna circuit may continue to resonate by self-oscillation effect. This self-oscillation phenomenon generates an antenna signal of amplitude greater than the one generated by the alternating external magnetic field FLD1. Such a self-oscillation signal can disturb a step of resynchronizing the oscillator that will be described below as it is not in phase with the external magnetic field FLD1.

In the embodiment represented in FIG. 1, the damping circuit DCT includes a timer, produced here in the form of a counter CP1, and a switch CSW driven by the counter CP1. The counter CPT receives at input the modulation signal MS(DTx) and the internal clock signal CKs and supplies the switch CSW with a damping signal DS. A terminal of the switch CSW is linked directly or indirectly (for example through a resistor) to a point of the antenna circuit ACT, for example a terminal of the antenna coil AC1 or any other damping point of the antenna signal. The other terminal of the switch CSW is linked to the ground. The switch CSW closes (i.e. becomes on) when the signal DS changes to an active value, here 1. The antenna circuit ACT then switches into a "damped" operating mode in which its impedance is modified such that the antenna signal AS decreases very rapidly.

The counter CPT is triggered by the change to 0 of the signal MS(DTx). The counter then puts the signal DS to 1 and starts counting. When the counter has counted a number NC of cycles of the clock signal CKs, it resets the signal DS to 0. The counting of the NC cycles of the clock signal CKs thus defines the duration of a phase Pd of damping the antenna signal, of a duration Td. When the damping phase Pd is over, the counter CPT resets the damping signal DS to 0 and the switch CSW returns into the open state.

FIGS. 2A to 2E show the operation of the circuit ND1. FIG. 2A represents the signal CKs, FIG. 2B represents the signal MS(DTx), FIG. 2C represents the signal MSK, FIG. 2D represents the damping signal DS, and FIG. 2E represents the signal Slm, composed of bursts of the signal CKs. For the sake of simplicity, the frequency of the signal CKs is not represented to scale. In FIG. 2B, periods P1 of emitting the magnetic field (bursts of magnetic field) in which the signal MS(DTx) is on 1, of a duration T1, separated by periods P2 of not emitting the magnetic field of a duration T2, in which the signal MS(DTx) is on 0, can be distinguished. In practice, the modulation signal MS(DTx) can have any other shape according to the data to be sent DTx, to the coding applied to the data DTx, and to the manner in which it is generated (in particular with or without a sub-carrier).

The bursts of the signal CKs, of a duration T1, are applied to the antenna circuit when the modulation signal MS(DTx) is equal to 1 (an inverse convention could be provided). The signal MSK is put to 0 when the signal MS(DTx) is equal to 1, and is kept on 0 during masking periods Pm of duration Tm greater than T1 but below T1+T2. During the masking periods Pm, the oscillator OSC1 does not receive the external clock signal CKe and operates in free oscillation mode.

Again with reference to FIGS. 2A to 2E, each non-emitting period P2 includes:
  the damping phase Pd, of duration Td,
  a restoration phase Pr, of duration Tr, and
  a resynchronization phase Psyn, of duration Tsyn, during which the oscillator circuit is in the synchronous oscillation mode.

FIG. 2D shows the damping phase Pd (DS=1, switch CSW closed). The signal DS changes to 1 immediately after the signal MS(DTx) has changed back to 0, i.e. when the non-emitting period P2 starts, and changes back to 0 before the signal MSK changes back to 1, i.e. before the resynchronization phase Psyn starts, this lapse of time defines the duration Tr of the restoration phase. Therefore, the restoration phase Pr follows the damping phase Pd and enables the amplitude of the antenna signal AS to be restored in the antenna circuit ACT. This restoration is "clean" as the damping phase Pd has eliminated the self-oscillation phenomenon which can occur at the end of the period P1.

In summary, the free oscillation period Pm includes the emitting period P1, the damping phase Pd, and the restoration phase Pr, i.e. Tm=T1+Td+Tr. The duration Tr of the restoration phase is equal to T2−Td−Tsyn and the duration Tsyn of the resynchronization phase Psyn is equal to T1+T2−Tm.

Figure 3A:
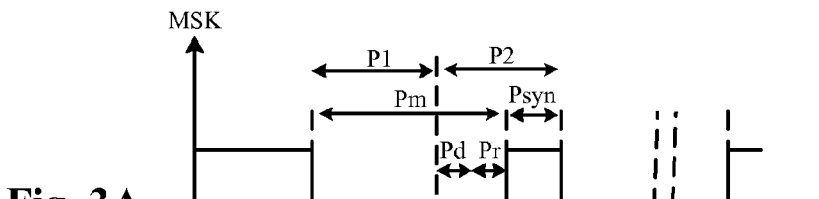
Figure 3B:
Figure 3C:
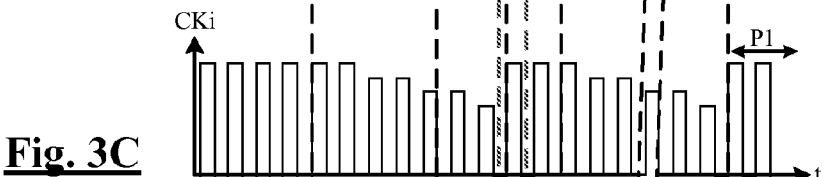
Figure 3D:

FIGS. 3A to 3D show more precisely the resynchronization mechanism of the signal CKs relative to the signal CKe, between two periods P1 of emitting the magnetic field FLD2. FIG. 3A represents the signal MSK and is identical to FIG. 2C. FIG. 3B represents the signal CKe and FIG. 3D represents the signal CKs. FIG. 3C represents an internal oscillation signal CKi of the oscillator circuit OSC1. The signals Cki and CKs are identical in frequency and only differ in their amplitude, that of the signal CKs being reduced here to the logic level 1 or 0.

FIG. 3B shows that the external clock signal CKe has a phase that may fluctuate during the free oscillation periods. Indeed, during these periods, the internal clock signal CKs is injected into the antenna circuit and is superimposed on the signal induced by the external magnetic field FLD1. Even though the signal CKs is synchronized quite precisely with the external clock signal CKe, the phase shift between the induced signal and the injected signal may be sufficient to cause a phase fluctuation rendering the antenna signal AS unable to supply a reliable external clock signal CKe. FIGS. 3C and 3D show however, that the phase of the internal clock signal CKs remains substantially stable during the free oscillation periods Pm thanks to the resynchronization phases Psyn.

Figure 4:
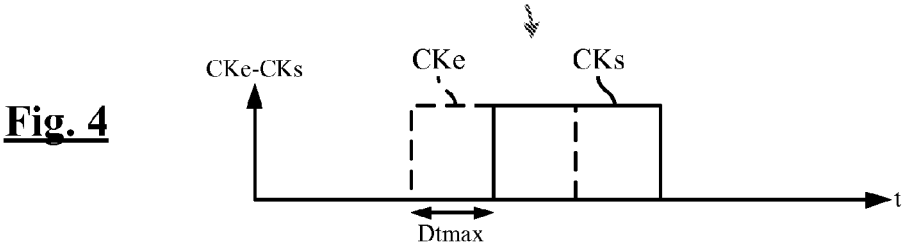

FIG. 4 represents the maximum phase shift Dtmax (expressed in time lag) between the signal CKs and the signal CKe, at the time the signal CKs is going to be resynchronized on the signal CKe, i.e. when the signal MSK is going to change back to 1. The value of Dtmax depends on the precision of the oscillator circuit OSC1 that is chosen depending on the intended application. A maximum phase shift of ¼ of the period of the signal CKe may for example be sought.

Thanks to the resynchronization phases Psyn occurring before each emission of a burst of magnetic field FLD2, it is not necessary for the oscillator circuit OSC1 to have extreme precision guaranteeing a maximum phase shift of ¼ of the period over the entire duration of a data frame DTx. The necessary precision is reduced to the scale of one bit of data DTx, and more precisely to the scale of the duration of a burst of magnetic field, which may represent only a fraction of a bit DTx depending on the coding used (a binary datum may possibly be coded in several bursts of magnetic field).

FIGS. 5A to 5E schematically show a data receiving sequence DTr (left-hand side of the FIGS.) as well as a data sending sequence DTx (right-hand side of the FIGS.).

FIG. 5A shows the shape of the antenna signal AS. FIG. 5B represents the modulation signal MS(DTr) extracted from the antenna signal AS by the circuit DMCT. FIG. 5C represents the active load modulation signal Slm including bursts of the signal CKs. FIG. 5D represents the modulation signal MS(DTx) and FIG. 5E represents the signal CKs. The signal AS is here a full-wave rectified ac signal that is the image of the magnetic field FLD1 in receive mode. Some embodiments of the antenna circuit ACT may however include a rectifying diode for rectifying the antenna signal. In this case, the latter is a half-wave signal.

During the receipt of data DTr, the external device EDV (see e.g., FIG. 1) modulates the amplitude of the magnetic field FLD1 with a modulation depth that depends on the chosen communication protocol, and the antenna signal AS has a similar amplitude modulation. Periods of non-modulation NM in which the amplitude of the antenna signal is maximum and modulation periods AM in which the amplitude of the antenna signal is minimum, can be distinguished. The maximum and minimum voltages of the signal AS depend in practice on the distance between the external device EDV and the device ND1.

During the sending of data DTx, the antenna signal AS also has non-modulation periods corresponding to the periods P2 of not emitting the magnetic field FLD2, during which its amplitude is identical to that observed during the non-modulation periods upon receiving data. The amplitude of the antenna signal then only depends on the magnetic field FLD1 emitted by the external device EDV and on the distance between the two devices. The signal AS also has over-voltage periods corresponding to the periods P2 of emitting the magnetic field FLD2. Indeed, the signal CKs is then injected into the antenna circuit and is superimposed on the signal induced by the external magnetic field FLD1. The antenna signal thus includes an induced component and an injected component.

FIG. 6 is a horizontally expanded view of the right-hand side part of FIG. 5A and shows the decrease in the amplitude of the antenna signal AS during the damping phase Pd and the increase in its amplitude during the restoration phase Pr (the amplitude of the antenna signal as represented is arbitrary). Depending on the damping rate provided when designing the damping circuit, the amplitude of the antenna signal becomes low or zero during the period Pd, and is then restored to its normal value during the restoration phase Pr. The "normal" value of the antenna signal is that induced by the external magnetic field FLD1. As indicated above, the damping phase enables a possible self-oscillation phenomenon to be neutralized after the sending period P1, which could generate a spurious antenna signal of a value greater than the value of this signal due to the presence of the external magnetic field FLD1. If this self-oscillation signal were not removed, the synchronous oscillator SO could resynchronize on the self-oscillation signal instead of resynchronizing on the external magnetic field FLD1.

Figure 7:
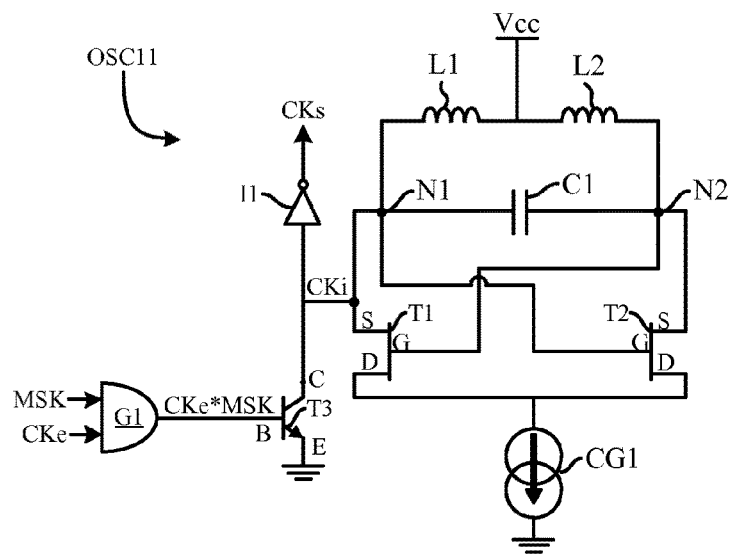

Various types of oscillator circuits may be provided to produce the synchronous oscillator SO. As an example, FIG. 7 shows an oscillator circuit OSC11 including an oscillator core of the astable multivibrator type (also referred to as an astable oscillator). This oscillator core includes two self-inductances L1, L2, a capacitor C1, two MOS-type transistors T1, T2, and a source of current CG1. The inductance L1 is connected between a supply node receiving a voltage Vcc and a node N1. The inductance L2 is connected between the voltage Vcc supply node and a node N2. The capacitor C1 is connected between the nodes N1, N2. The transistor T1 has its source S connected to the node N1, its drain D linked to the ground through the source of current CG1, and its gate G connected to the node N2. The transistor T2 has its source S connected to the node N2, its drain D linked to the ground through the source of current CG1, and its gate G connected to the node N1.

Moreover, the synchronization input of the oscillator circuit OSC11 is formed by the base B of a bipolar transistor T3 the emitter E of which is linked to the ground and the collector C of which is linked to the node N1. The output of the oscillator circuit is formed by an inverter gate I1 supplying the signal CKs, the input of which is linked to the node N1, on which the internal oscillation signal CKi is present.

When the signal CKe is applied to the base B of the transistor T3 (MSK=1), the phase of the signal CKi on the node N1 is imposed by the signal CKe. The core of the oscillator circuit then no longer functions like an astable oscillator but like a monostable oscillator.

When the signal MSK is equal to 0, the transistor T3 is no longer conductive and the core of the oscillator circuit functions in astable oscillator mode and oscillates freely at a self-oscillation frequency. This frequency is set as close as possible to the frequency of the signal CKe (13.56 MHz in the framework of the abovementioned standards) by an appropriate choice of the inductances L1, L2 and of the capacitor C1.

In one alternative embodiment, the oscillator circuit OSC1 can be of the digital type and configured, in the synchronous oscillation mode, to analyze and store the frequency of the signal CKe received at the synchronization input, and to copy the signal CKe at its output. When it switches into the free oscillation mode, the oscillator circuit rebuilds the signal CKs from this stored value.

Figure 8:
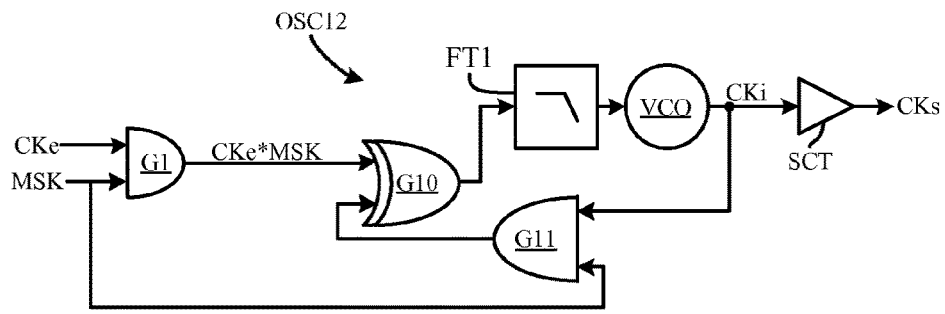

As another example of an embodiment, FIG. 8 shows an oscillator circuit OSC12 including a phase locked loop. The circuit OSC12 includes a gate G10 of exclusive OR type, an active low-pass filter FT1, a voltage-controlled oscillator (VCO), a follower SCT, and a gate G11 of AND type. The VCO supplies the internal oscillation signal CKi. The latter is applied to the follower SCT, the output of which supplies the internal clock signal CKs. The internal oscillation signal CKi is also sent back to an input of the gate G10 through the gate G11, which receives the signal MSK at another input. Another input of the gate G10 forms the synchronization input of the circuit OSC12 and is linked to the output of the gate G1, which supplies the external clock signal CKe when the signal MSK is equal to 1. The gate G10 forms a phase comparator and its output is sent to a control input of the VCO through the active low-pass filter FT1.

When the signal MSK is equal to 1, the gate G11 is on, the gate G10 receives both the signal CKi and the signal CKe and supplies a phase-difference signal. After low-pass filtering, this differential signal forms a setpoint voltage of the VCO. The signal Cki is thus phase controlled with the signal CKe. When the signal MSK changes to 0, the outputs of the gates G1 and G11 change to 0. The output of the gate G10 is forced to 0. Means enable the setpoint voltage that the VCO received before the signal MSK changed to 0 to be maintained at the input of the VCO. These means include for example a voltage source arranged in the active low-pass filter FT1, such as a charge pump. Thus, the VCO continues to supply the signal CKi and maintains the phase of the signal CKi close to that of the signal CKe.

It will be understood by those skilled in the art that the data sending/receiving device ND1 according to the present invention is susceptible of various embodiments. In particular, the modulation circuit MCT may, in addition to the active load modulation means that have been described, include conventional passive load modulation means, such as a load modulation switch connected to the antenna circuit ACT.

Similarly, the damping circuit DCT is susceptible of various embodiments. For example, instead of linking a point of the antenna circuit to the ground, the circuit DCT can be designed to link two points of the antenna circuit that are not generally linked, or even to fully short-circuit the antenna circuit so as to totally neutralize the antenna signal. Generally speaking, the impedance of the antenna circuit can be modified with an actual load (short-circuit, switched resistor in parallel with elements of the antenna circuit) or an imaginary load (i.e. inducing a phase shift of 90°), for example a capacitor or a self-inductance that modifies the resonance frequency of the antenna circuit, or a combination of both. The aim is to rapidly discharge the antenna coil to retrieve an antenna signal that is only generated by the external magnetic field and free from any self-oscillation component.

The number NC can be fixed or programmable, for example by way of a write-accessible register of the counter CPT. The damping circuit can also be programmable and offer several damping rates which can be selected when it is commissioned.

In one alternative embodiment, the signal MSK is applied to the gain control circuit AGC and the latter is configured to force the output of the amplifier A2 to 0. In this case, it may not be necessary to prevent the application of the signal CKe to the synchronization input of the oscillator circuit OSC1, the latter automatically switching into the free oscillation mode when the signal CKe changes to 0.

The device ND1 may also include means for extracting a supply voltage Vcc from the antenna signal, such as a rectifier circuit followed by a smoothing capacitor, to enable the device ND1 to operate in a purely passive mode in the absence of a local power source.

Figure 9:
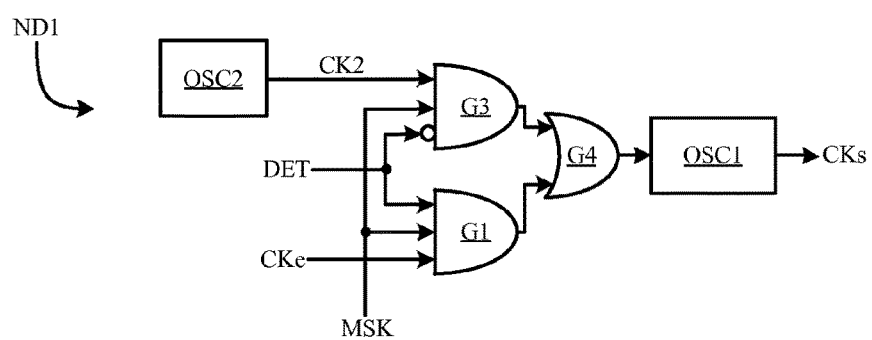

According to one embodiment represented in FIG. 9, the device ND1 also includes an oscillator OSC2 that is not synchronized to the external clock signal CKe, for example a quartz oscillator. The oscillator OSC2 supplies a clock signal CK2 allowing the device DV1 to operate in NFC reader mode to dialogue with a passive contactless integrated circuit or with a similar device configured in passive mode. In this case, the synchronous oscillator circuit OSC1 may continue to be used to supply the internal clock signal CKs. The clock signal CKe or CK2 applied to the synchronization input of the circuit OSC1 may be selected by way of the signal DET described above, by giving priority to the passive mode.

Again with reference to FIG. 9, two gates G3 and G4 are added and the gate G1 is modified to have three inputs. The gate G3 is an AND gate having three inputs one of which is an inverting input. The gate G4 is an OR-type gate with two inputs. The gate G3 receives the signal CK2 and the signal MSK at its two non-inverting inputs, and receives the signal DET at its inverting input. The gate G1 receives the signals CK2, DET, and CKe at its inputs. The outputs of the gates G1 and G3 are applied to the gate G4, the output of which is linked to the synchronization input of the oscillator circuit OSC1. When the signal DET is equal to 1 (presence of an external magnetic field FLD1), the output of the gate G3 is forced to 0 and the device operates in passive mode in the manner described above. When the signal DET is equal to 0, the output of the gate G1 is forced to 0 and the signal MSK is forced to 1 by the circuit MG. The clock signal CK2 is applied to the input of the oscillator circuit OSC1, for the permanent emission of the magnetic field FLD1. The structure of the gate G2, receiving the signals CKs and MS(DTx) and supplying the signal Slm, may be modified so that the latter ensures a modulation of the signal CKs with an adjustable modulation depth lower than 100%, in particular if the device must comply with ISO 14443A and 14443B standards.

Figure 10:
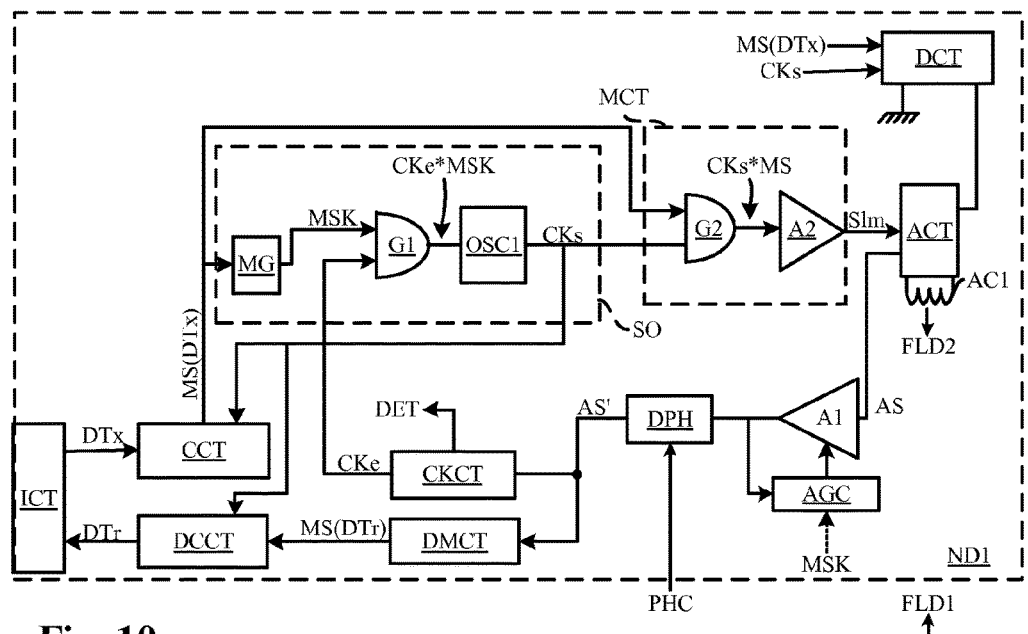

In the example of an embodiment represented in FIG. 10, the device ND1 further includes a phase shifter DPH. This phase shifter is for example arranged at the output of the amplifier A1. The phase shifter DPH applies a phase shift Dp to the antenna signal AS and supplies the clock circuit CKCT and the demodulation circuit DMCT with a phase-shifted antenna signal AS'. The phase shift Dp may be fixed and determined upon designing the phase shifter DPH. Alternatively, the phase shift Dp may be determined dynamically by a command PHC applied to the phase shifter, which specifies the value of the phase shift Dp, for example between 0 and 360°.

The phase shifter DPH enables the device ND1 to emit bursts of magnetic field FLD2 that have the phase shift Dp relative to the external magnetic field FLD1. This enables for example, in certain applications in which the communication distance must not exceed a certain threshold (for security reasons for example), the communication distance to be reduced below this threshold.

This embodiment shows that controlling the phase of the signal CKs by means of the synchronous oscillator SO enables more than just a zero phase shift between the magnetic field FLD2 and the magnetic field FLD1 to be targeted. Controlling the phase of the signal CKs by way of the synchronous oscillator SO may also enable a voluntary desynchronization of the magnetic field FLD2 relative to the magnetic field FLD1 to be controlled, while maintaining the phase shift Dp between the two magnetic fields at a value as constant as possible.

The data sending/receiving device ND1 according to the present invention is also susceptible of various applications. In an example of application represented in FIG. 11, the device ND1 is integrated into a portable device HD1 and is linked to one or more host processors, here two host processors HP1, HP2 that use the device ND1 as a contactless communication interface (NFC interface). The portable device HD1 is for example a mobile telephone, a digital music player, or a personal digital assistant (PDA). The processor HP1 may be the main processor of the device, or a secure processor such as a SIM card processor. The processor HP2 may for example be the baseband processor of a mobile telephone, also ensuring GSM channel communications.

In another example of application represented in FIGS. 12A, 12B, the device ND1 is linked to a host processor HP1 and the assembly is integrated into a plastic CD medium to form a smart card HD2. The antenna coil AC1 is for example a coplanar coil having one or more turns on its rear face (FIG. 12B). The card HD2 is equipped with a group CP of contacts. The card HD2 may for example form an NFC SIM card. The group of contacts may in this case include contacts C1 to C8 according to ISO 7816 standard. The card HD2 may also form a card of SD type, intended to be inserted into any type of device (mobile telephone, personal computer, or the like) as an NFC communication interface.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. A method comprising:
producing, by an inductive antenna circuit, a first periodic signal that is based on an alternating external magnetic field;
producing, by an oscillator circuit, a second periodic signal that is based on the first periodic signal;
transmitting, in correspondence with a data-carrying modulation signal, a sequence of data bits of a data frame by sequentially and repetitively:
applying, with the oscillator circuit operating in a free oscillation mode, the second periodic signal to the inductive antenna circuit to transmit a portion of the data frame, the second periodic signal being applied to the inductive antenna circuit in response to the data-carrying modulation signal having a first logic value; and
after transmitting the portion of the data frame, inhibiting, with the oscillator circuit operating in a synchronous oscillation mode, application of the second periodic signal to the inductive antenna circuit, application of the second periodic signal to the inductive antenna circuit being inhibited in response to the data-carrying modulation signal having a second logic value, the second logic value being opposite the first logic value,
the synchronous oscillation mode of the oscillator circuit causing the second periodic signal to be synchronized to the first periodic signal.

2. The method of claim 1, further comprising:
inhibiting application of the first periodic signal to a synchronization input of the oscillator circuit when the oscillator circuit is placed in the free oscillation mode; and
applying the first periodic signal to the synchronization input of the oscillator circuit when the oscillator circuit is placed in the synchronous oscillation mode.

3. The method of claim 2, wherein applying and inhibiting application of the first periodic signal to the synchronization input of the oscillator circuit includes applying and inhibiting application of the first periodic signal to the synchronization input of the oscillator circuit responsive to a masking signal.

4. The method of claim 1, further comprising phase shifting the second periodic signal relative to the first periodic signal.

5. The method of claim 1, wherein the sequence of data bits includes a sequence of encoded data bits.

6. The method of claim 1, further comprising:
supplying a control voltage based on a phase signal;
generating the second periodic signal responsive to the control voltage; and
inhibiting supplying of the phase signal when placing the oscillator circuit in the free oscillation mode, so as to maintain a value of the control voltage.

7. A device for sending a data frame, the device comprising:
an inductive antenna circuit configured to produce a first periodic signal that is based on an alternating external magnetic field;
an oscillator circuit configured to produce a second periodic signal that is based on the first periodic signal; and
an active load modulation circuit configured to provide a data-carrying modulation signal,
the device being configured to:
transmit, in correspondence with the data-carrying modulation signal, a sequence of data bits of a data frame by sequentially and repetitively:
applying, with the oscillator circuit operating in a free oscillation mode, the second periodic signal to the inductive antenna circuit to transmit a portion of the data frame, the second periodic signal being applied to the inductive antenna circuit in response to the data-carrying modulation signal having a first logic value; and
after transmitting the portion of the data frame, inhibiting, with the oscillator circuit operating in a synchronous oscillation mode, application of the second periodic signal to the inductive antenna circuit, application of the second periodic signal to the inductive antenna circuit being inhibited in response to the data-carrying modulation signal having a second logic value, the second logic value being opposite the first logic value,
the synchronous oscillation mode of the oscillator circuit causing the second periodic signal to be synchronized to the first periodic signal.

8. The device of claim 7, wherein:
application of the first periodic signal to a synchronization input of the oscillator circuit is inhibited when the oscillator circuit is placed in the free oscillation mode; and
the first periodic signal is applied to the synchronization input of the oscillator circuit when the oscillator circuit is placed in the synchronous oscillation mode.

9. The device of claim 8, wherein the device is configured to selectively apply and inhibit application of the first periodic signal to the synchronization input of the oscillator circuit responsive to a masking signal.

10. The device of claim 7, wherein the oscillator circuit includes an astable oscillator having a specific self-oscillation frequency determined by components of the astable oscillator.

11. The device of claim 7, wherein the oscillator circuit further includes a phase locked loop including:
a phase comparator configured to provide a phase signal;
an active low-pass filter configured to receive the phase signal and supply a control voltage based on the phase signal; and
a voltage-controlled oscillator configured to receive the control voltage and generate the second periodic signal responsive to the control voltage,
wherein the phase comparator is inhibited from supplying the phase signal when switching into the free oscillation mode, so as to maintain a value of the control voltage at an input of the voltage-controlled oscillator.

12. The device of claim 7, further comprising a phase shifting circuit configured to phase shift the second periodic signal relative to the first periodic signal.

13. The device of claim 7, further comprising at least one host processor configured to supply the device with data to be sent.

14. The device of claim 7, wherein the device is mounted in or on a portable medium.

15. The device of claim 7, wherein the device is included in a smart card.

16. The device of claim 7, wherein the data frame includes a plurality of encoded data bits.

* * * * *